(12) United States Patent
Gumringer et al.

(10) Patent No.: US 6,855,281 B2
(45) Date of Patent: Feb. 15, 2005

(54) METHOD OF FORMING AN ARTICLE OF FOOTWEAR

(75) Inventors: Rodney Ross Gumringer, Vancouver, WA (US); Michael Todd Jennings, Camas, WA (US)

(73) Assignee: The North Face Apparel Corp, Wilmington, DE (US)

( * ) Notice: Subject to any disclaimer, the term of this patent is extended or adjusted under 35 U.S.C. 154(b) by 106 days.

(21) Appl. No.: 10/281,133

(22) Filed: Oct. 28, 2002

(65) Prior Publication Data

US 2004/0080077 A1 Apr. 29, 2004

(51) Int. Cl.$^7$ .............................................. B29C 45/00
(52) U.S. Cl. ...................... 264/132; 264/238; 264/244; 156/60
(58) Field of Search ................................ 264/244, 132, 264/238; 156/60, 182

(56) References Cited

U.S. PATENT DOCUMENTS

| | | | |
|---|---|---|---|
| 3,975,840 A | 8/1976 | Juzenko | 36/117 |
| 4,302,169 A | * 11/1981 | deOliveria | 425/119 |
| 5,743,027 A | 4/1998 | Barma | 36/4 |
| 5,776,402 A | 7/1998 | Glaesener | 264/239 |
| 5,778,473 A | 7/1998 | Chen | 12/142 T |
| 5,783,276 A | 7/1998 | Lyford | 428/79 |
| 6,464,907 B2 | 10/2002 | Gross | 264/21 |

FOREIGN PATENT DOCUMENTS

| | | | |
|---|---|---|---|
| FR | 2083185 A | * | 12/1971 |
| FR | 2358253 A | * | 3/1978 |
| GB | 2 146 282 A | | 4/1985 |
| JP | 6-335403 A | * | 12/1994 |

* cited by examiner

Primary Examiner—Edmund H. Lee
(74) Attorney, Agent, or Firm—Collier Shannon Scott, PLLC

(57) ABSTRACT

In a method of forming an article of footwear, a shell is formed between at least two die portions. The shell has a flash line defined proximate an interface of the die portions and along a perimeter of the shell. The method may include coupling a component directly to the shell so that the flash line is at least in part disposed proximate or below an upper edge of the component, with the component selected from the group consisting of a midsole and an outsole. The flash line may be positioned to coincide with an edge of a ridge on the shell.

42 Claims, 6 Drawing Sheets

METHOD OF FORMING AN ARTICLE OF FOOTWEAR

FIELD OF THE INVENTION

The invention relates generally to methods and apparatuses for forming shells for articles of footwear. In particular, the present invention relates to methods and apparatuses for molding shells such that the flash line is positioned along a perimeter of the shell.

BACKGROUND OF THE INVENTION

Footwear manufacturing operations involve a multi-step procedure in which an upper, comprising an assembly of various components used to cover and support the top of the foot, is coupled to a sole. Outdoor multi-purpose boots, in particular, are typically constructed by assembling an outsole, a molded shell, an insole, and an upper. The molded shell is often formed by injecting a polyurethane or other suitable polymer into an appropriately shaped mold, where the polymer cures into a solid shell. Use of polymers such as polyurethane permits the manufacture of a shell that provides waterproofing, resiliency, and resistance to damage.

Prior art shells have been molded using a pair of mold faces which together form a cavity that defines the outer shape of the shell. During molding of a shell, the mold faces are joined and molding material is introduced into the cavity. Typically, some of the molding material escapes along the interface of the mold faces. This creates a feature that is commonly known as a flash line or parting line—a raised line on the surface of a molding. The flash line is generally undesirable, as it may detract from the aesthetic and/or functional qualities of the shell. Additional finishing operations may be required to remove the excess material so that it does not remain on the final product in a prominent location. In order to "hide" the flash line, some shell designs incorporate ribs or other protrusions and molded geometries coinciding with the location of the flash line. For example, the rib may be molded along the longitudinal axis of the shell, at the location where the mold faces were joined during injection molding.

As shown in FIGS. 1 and 2, a prior art polyurethane shell 8 may be produced using cooperating halves of a split metal die assembly 10. A left die half 12 mates with a right die half 14 to create a cavity 16 in a desired outer shell shape. Die halves 12, 14 are configured and dimensioned such that each die half defines either the lateral portion 12' of shell 8 or the medial portion 14' of shell 8. A last or inner mold portion 18 is disposed between die halves 12, 14 in cavity 16, thereby creating a desired inner shell shape. Cavity 16 of die assembly 10 is in communication with runners 20 ending in gates 22, through which polyurethane flows for injection into cavity 16. After polyurethane is injected into and fills cavity 16 in the space defined between die halves 12, 14 and inner mold portion 18, sprues may be created integrally with the shell as a remnant of the molding process.

As shown in FIG. 2, a flash line 24 is disposed along the longitudinal axis 26 of shell 8. Flash line 24, for example, is generally in the form of a protrusion extending above the adjacent surface 28 of lateral portion 12' and adjacent surface 30 of medial portion 14'. Because of the mating of die halves 12, 14, flash line 24 is disposed in both the toe region 32 and the heel region 34 of shell 8. Especially proximate toe region 32, flash line 24 provides a stiffened region of shell 8 proximate longitudinal axis 26, which may adversely impact performance of shell 8 by limiting flexure when disposed around a foot of a user.

In view of the prior art shell and manufacturing technique therefor, there exists a need for an improved shell and manufacturing method. In particular, there exists a need for shells molded such that the flash line is positioned along a perimeter thereof, instead of along the longitudinal axis, so that flexure proximate the axis is not hindered by the flash line. There also exists a need for a method of manufacturing shells which obviates the need for performing extensive finishing operations on the outer surface of the shell that is exposed in the finished boot.

SUMMARY OF THE INVENTION

The invention relates to a method of forming an article of footwear including: forming a shell between at least two die portions, the shell having a flash line defined proximate an interface of the die portions and along a perimeter thereof. The method may further include coupling a component directly to the shell so that the flash line is at least in part disposed proximate or below an upper edge of the component, with the component selected from the group consisting of a midsole and outsole. In addition, the method may include: coupling a midsole to a lower portion of the shell; disposing a shank between the midsole and shell; coupling an outsole to a lower portion of the midsole; disposing an insole inside the shell; disposing at least one cushion between the insole and shell, wherein the at least one cushion comprises a cushion disposed proximate a heel region of the shell and a cushion disposed proximate a forefoot region of the shell; and coupling an upper to an upper portion of the shell. Furthermore, the method may include bonding a component directly to the shell, with the component selected from the group consisting of a midsole and an outsole. The component and shell may be adhesively bonded to each other. An inner mold portion may be disposed in a cavity between the die portions when the shell is formed.

The flash line may extend substantially around the perimeter of the shell, and may coincide with at least a portion of an edge of a ridge on the shell, wherein the ridge may be disposed proximate a heel end of the shell. The flash line may be disposed along a sidewall of the shell and define a first surface above the flash line and a second surface below the flash line, wherein the first and second surfaces have different texturing. At least one rib may be disposed on the shell transverse to the flash line. Also, a top portion of the shell may be substantially smooth proximate a central longitudinal axis of the shell.

The shell may be formed of a polyurethane and formed by injection molding. Indicia may be disposed on the shell, and may be integrally formed therewith.

Each die portion may define one of the group consisting of substantially the entirety of an upper portion of the shell and substantially the entirety of a lower portion of the shell. In some methods, the die portion defining the upper portion of the shell may be disposed above the die portion defining the lower portion of the shell. In other methods, the die portions may be disposed in side by side relation such that the die portion defining the upper portion of the shell may be disposed adjacent the die portion defining the lower portion of the shell, each die portion having a toe end and a heel end with the toe ends of the die portions being disposed above the heel ends of the die portions.

The invention also relates to a method of forming an article of footwear including: forming a shell between at least two cooperating die portions defining a cavity, the shell having a parting line defined proximate an interface of the die portions and extending around a perimeter thereof, and coupling a lower portion of the shell to a component selected from the group consisting of a midsole and an outsole. The component may be coupled to the shell so that the parting line is at least in part disposed proximate or below an upper edge of the component. The parting line may coincide with an edge of a ridge on the shell. The method may further include: forming sprues only proximate an outside bottom portion of the shell; substantially removing the sprues from the shell; coupling an upper portion of the shell to an upper; and disposing an inner mold portion between the cooperating die portions in the cavity defined therebetween while the shell is formed. The shell may be formed by injecting polymer through a plurality of runners each communicating with the cavity proximate a bottom face of the die portion that defines the lower portion of the shell.

One of the at least two cooperating die portions may define a lower portion of the shell. Each die portion may define one of the group consisting of substantially the entirety of an upper portion of the shell and substantially the entirety of a lower portion of he shell. In some methods, the die portions may be disposed in side by side relation, each die portion having a toe end and a heel end with the toe ends of the die portions being disposed above the heel ends of the die portions. The cooperating die portions may be provided with portions that mate in male-female relation when the die portions are aligned with respect to each other.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF PREFERRED EMBODIMENTS

Figure 1:
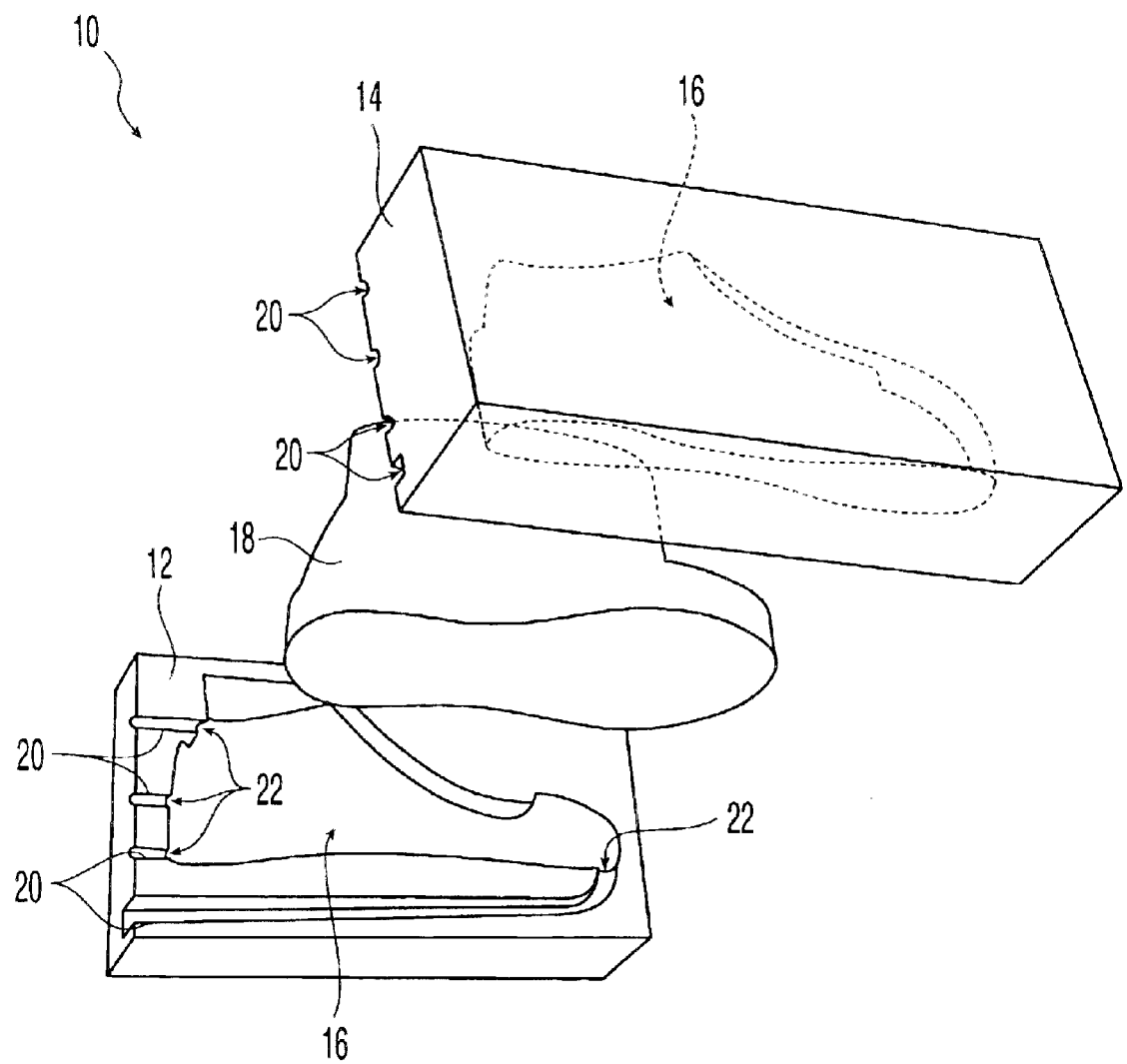
FIG. 1 shows a perspective view of a prior art split metal die assembly with an inner mold portion.
Figure 2:
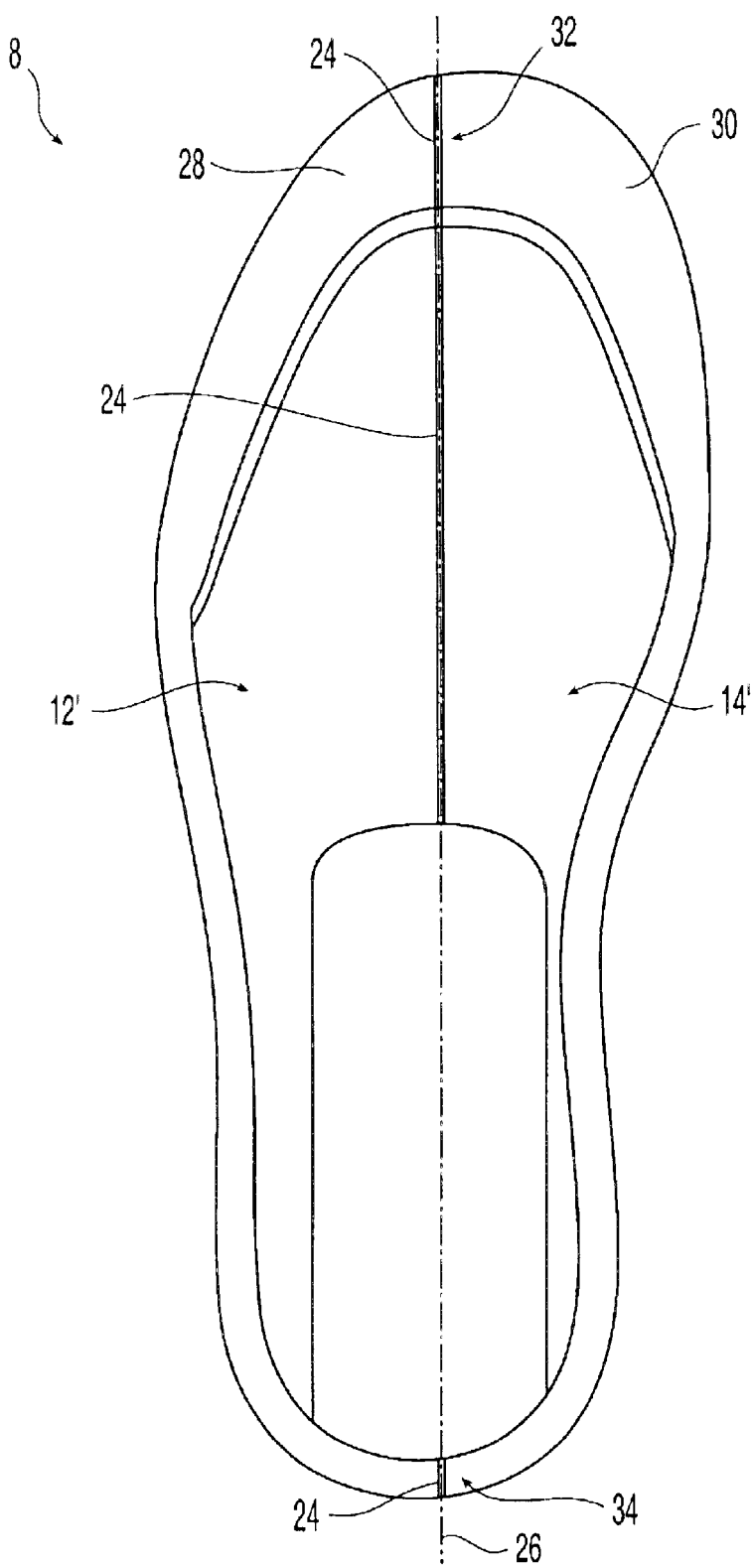
FIG. 2 shows a top view of a prior art shell formed with the split metal die assembly of FIG. 1.
Figure 3:
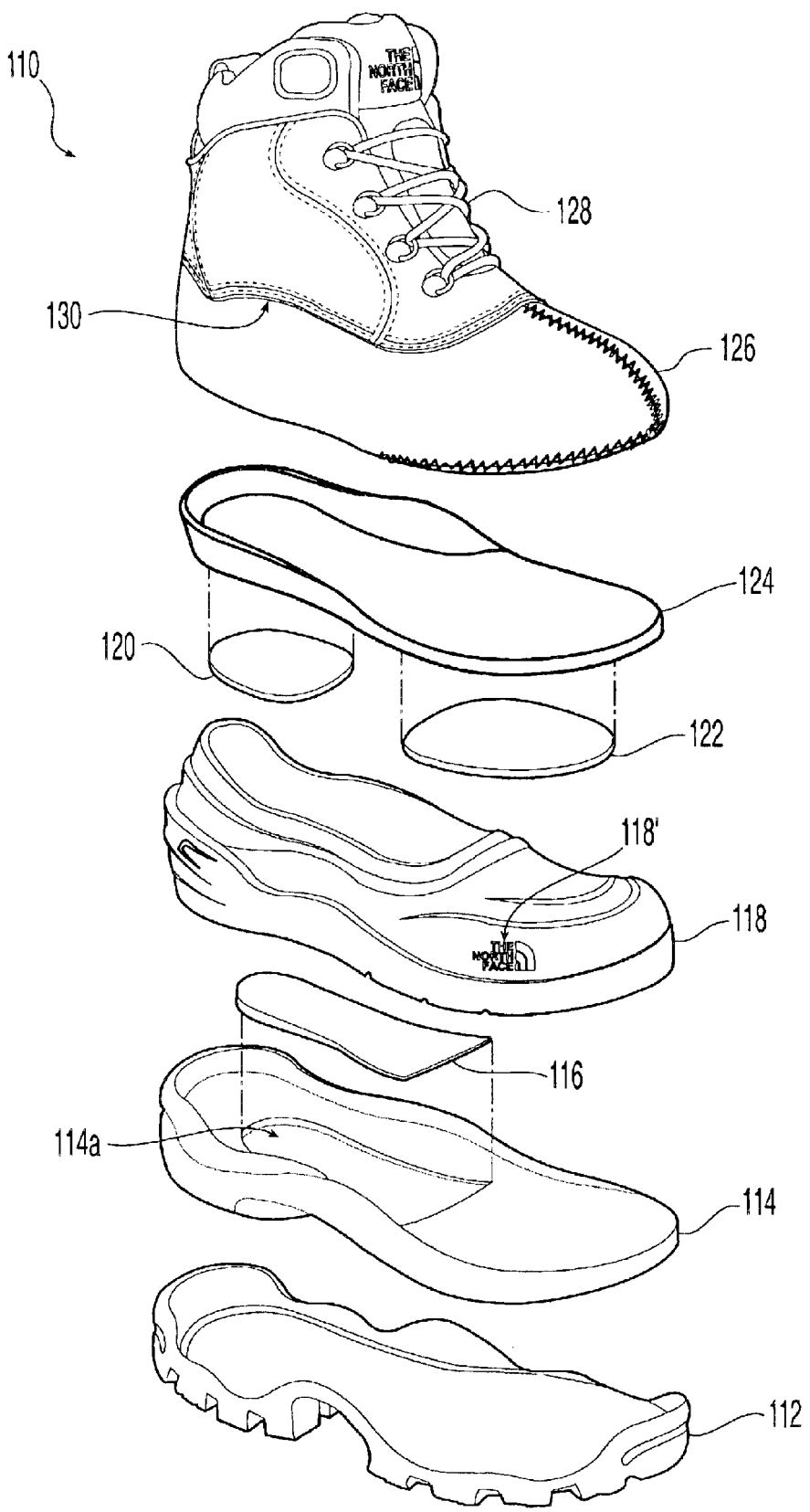
FIG. 3 shows an exploded perspective view of an exemplary boot construction according to the present invention.

Referring to FIG. 3, an exemplary boot construction according to the present invention is shown. Boot 110 includes an outsole 112, midsole 114, shank 116, and shell 118. Heel cushion 120 and forefoot cushion 122 may be disposed between an insole 124 and shell 118. An upper 126 also is provided, and optionally may include lacing 128.

Preferably, shank 116 is disposed in a recess 114a in midsole 114, while cushions 120, 122 are disposed in recesses in insole 124.

In an exemplary preferred embodiment, outsole 112 is formed of carbon rubber, while midsole 114 is formed of molded ethyl vinyl acetate foam. Shank 116 may be formed of a thermoplastic polyurethane, while upper 126 may be formed of leather, fabric textiles, foam and other suitable insulation. The various polymer components may be coupled to each other with an adhesive or other bonding agent, while upper 126 may be coupled to shell 118, for example, using stitching proximate the lower edge of leather portion 130 of upper 126.

Figure 4:
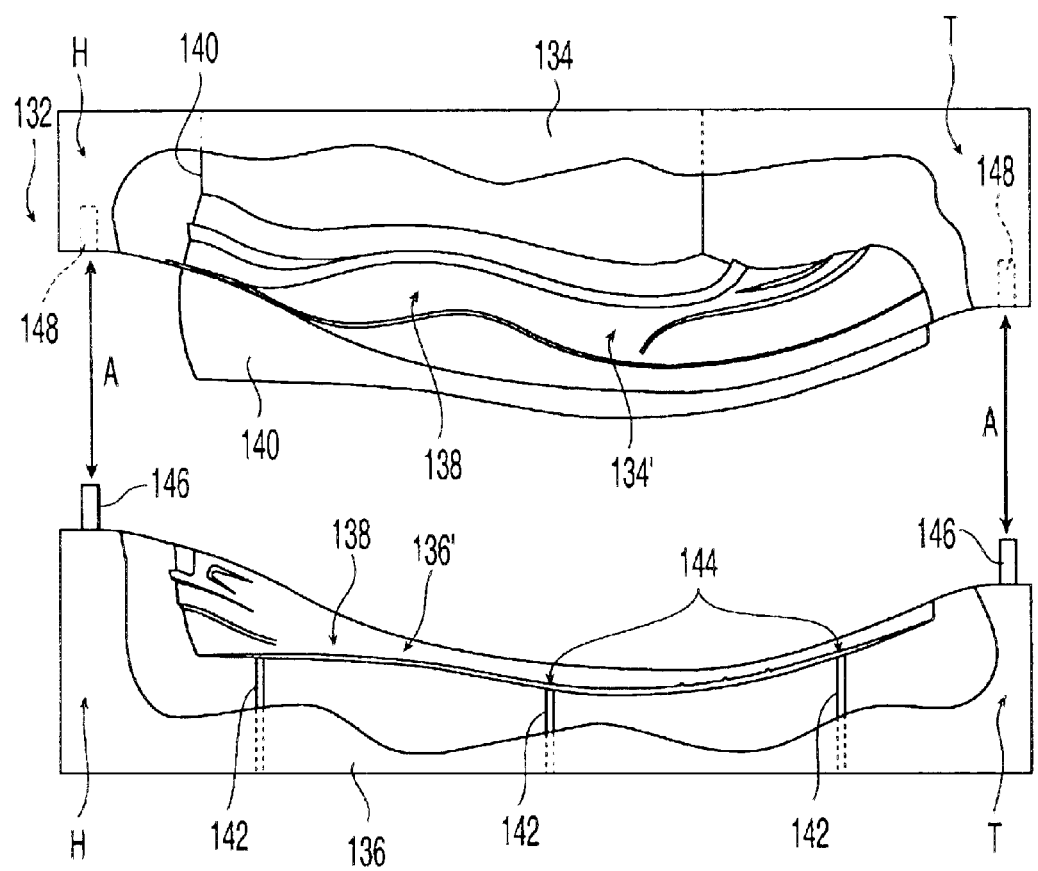
FIG. 4 shows a partial cross-sectional side view of an exemplary disengaged split metal die assembly with an inner mold portion according to the present invention.
Figure 5:
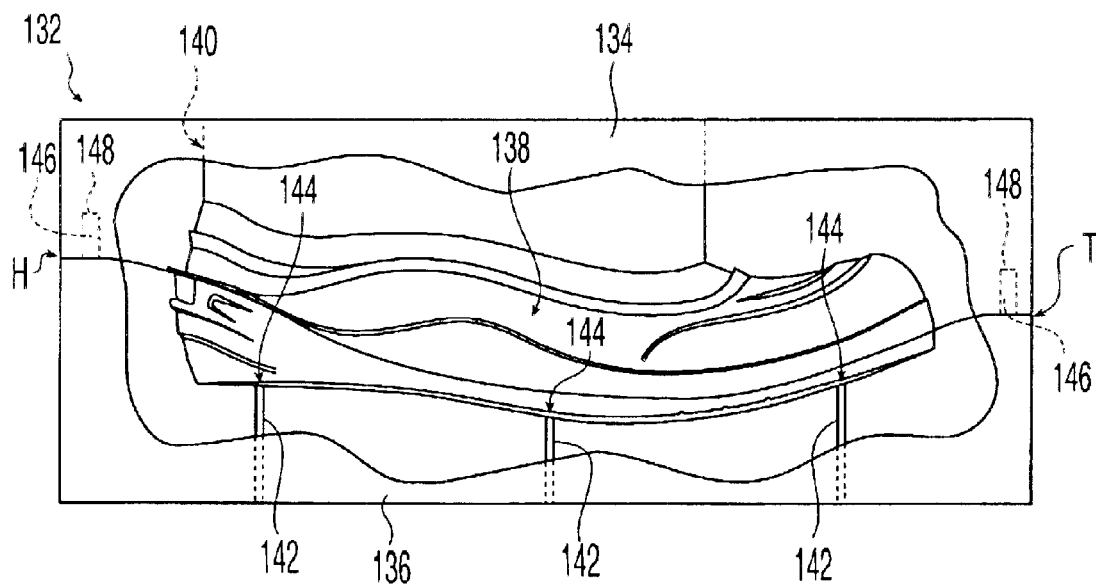
FIG. 5 shows a partial cross-sectional side view of the exemplary split metal die assembly of FIG. 4 in an engaged position.

Turning to FIGS. 4 and 5, an exemplary split metal die assembly 132 according to the present invention is shown. A first die portion 134 mates with a cooperating second die portion 136 to create a cavity 138 in a desired outer shell shape. In one preferred embodiment, die portions 134, 136 are formed of steel and configured and dimensioned such that each die portion defines either an upper portion 134' of shell 118 or a lower portion 136' of shell 118. A last or inner mold portion 140 is disposed between die portions 134, 136 in cavity 138, thereby creating a desired inner shell shape. Cavity 138 of die assembly 132 is in communication with runners 142 ending in gates 144, through which polyurethane flows for injection into cavity 138. After polyurethane is injected into and fills cavity 138 in the space defined between die portions 134, 136 and inner mold portion 140, sprues may be created integrally with the shell as a remnant of the molding process. In one preferred embodiment, runners 142 only communicate with cavity 138 proximate bottom face 139 of die portion 136 defining lower portion 136' of shell 118. Thus, sprues are only created during the molding process proximate the outside, bottom portion of shell 118. Sprues therefore may be removed without meticulous finishing operations, and artifacts thereof are hidden from view by another component of boot 110 such as midsole 114. Preferably, shell 118 is formed of an injectable thermoplastic polyurethane which cures to form a generally flexible body. In one embodiment, a TPU is used with a durometer (hardness) of 80±3 on the Shore A scale. In alternate embodiments, shell 118 is formed of another synthetic material.

Shell 118 may be molded to include indicia 118' on the outer surface thereof. In one embodiment, indicia 118', such as a logo or other feature, are molded on either a lateral or medial side of shell 118. By consistently molding indicia 118' on a lateral or medial side of shell 118, the indicia 118' may serve to indicate whether the shell 118 is configured and dimensioned for use with a left or right foot. In other words, indicia 118' may assist in identifying whether shell 118 should be used in the manufacture of a boot for a left foot or a right foot.

Die portions 134, 136 may be provided with portions that mate in male-female relation when die portions 134, 136 are aligned with respect to each other. At least one of die portions 134, 136 may be provided with alignment features, such as alignment posts 146. Recessed regions 148 are provided in the die portion 134, 136 opposing each post 146 and aligned therewith, such that movement of die portions 134, 136 toward each other in the direction of arrows A permits each post 146 to mate with a corresponding recessed region 148.

Although die portions 134, 136 are shown with upper portion 134' of shell 118 formed above lower portion 136' of shell 118, other orientations are within the scope of the present invention. For example, in a preferred exemplary embodiment, upper portion 134' of shell 118 instead may be formed to the left or right of lower portion 136' of shell 118, as long as cavity 138 is created when die portions 134, 136 mate. Thus, die portions 134, 136 are disposed in side by side relation such that die portion 134 defining upper portion 134' of shell 118 is disposed adjacent die portion 136 defining lower portion 136' of shell 118, each die portion 134, 136 having a toe end T and a heel end H with the toe ends T of die portions 134, 136 disposed above the heel ends H of die portions 134, 136. In another embodiment, upper portion 134' may be formed below lower portion 136'.

Die portions 134, 136 mate and form an interface disposed proximate a perimetral portion of cavity 138. Thus, in one preferred embodiment, the interface is formed proximate one or more perimetral features to be molded in shell 118, such as a ridge, recess, or transition between surface textures or patterns.

Figure 6:
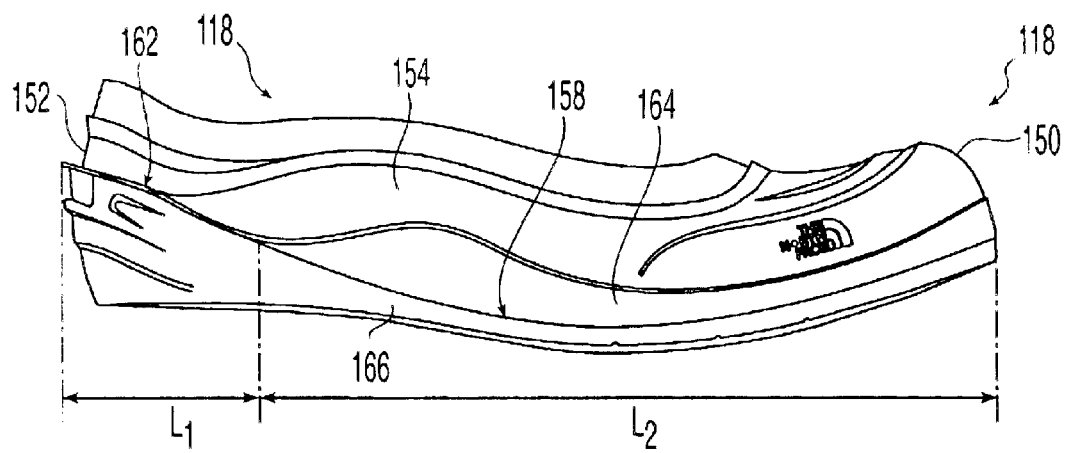
FIG. 6 shows a lateral side view of the exemplary shell of FIG. 3.
Figure 7:
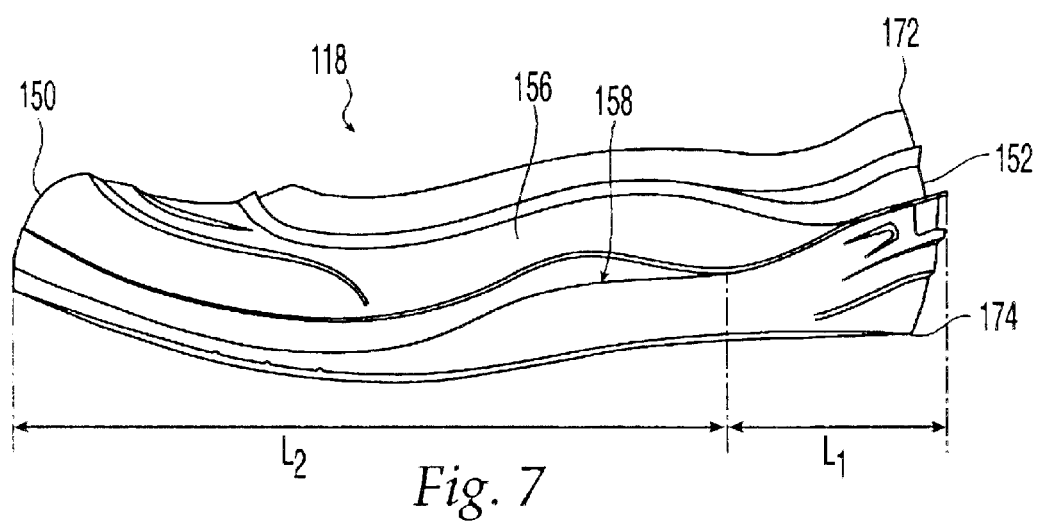
FIG. 7 shows a medial side view of the exemplary shell of FIG. 3.
Figure 8:
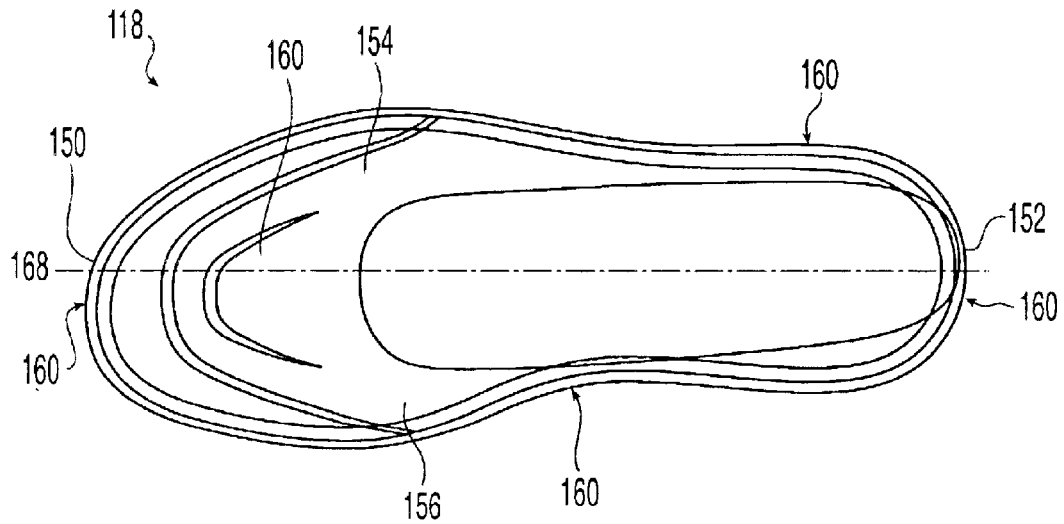
FIG. 8 shows a top view of the exemplary shell of FIG. 3.
Figure 9:
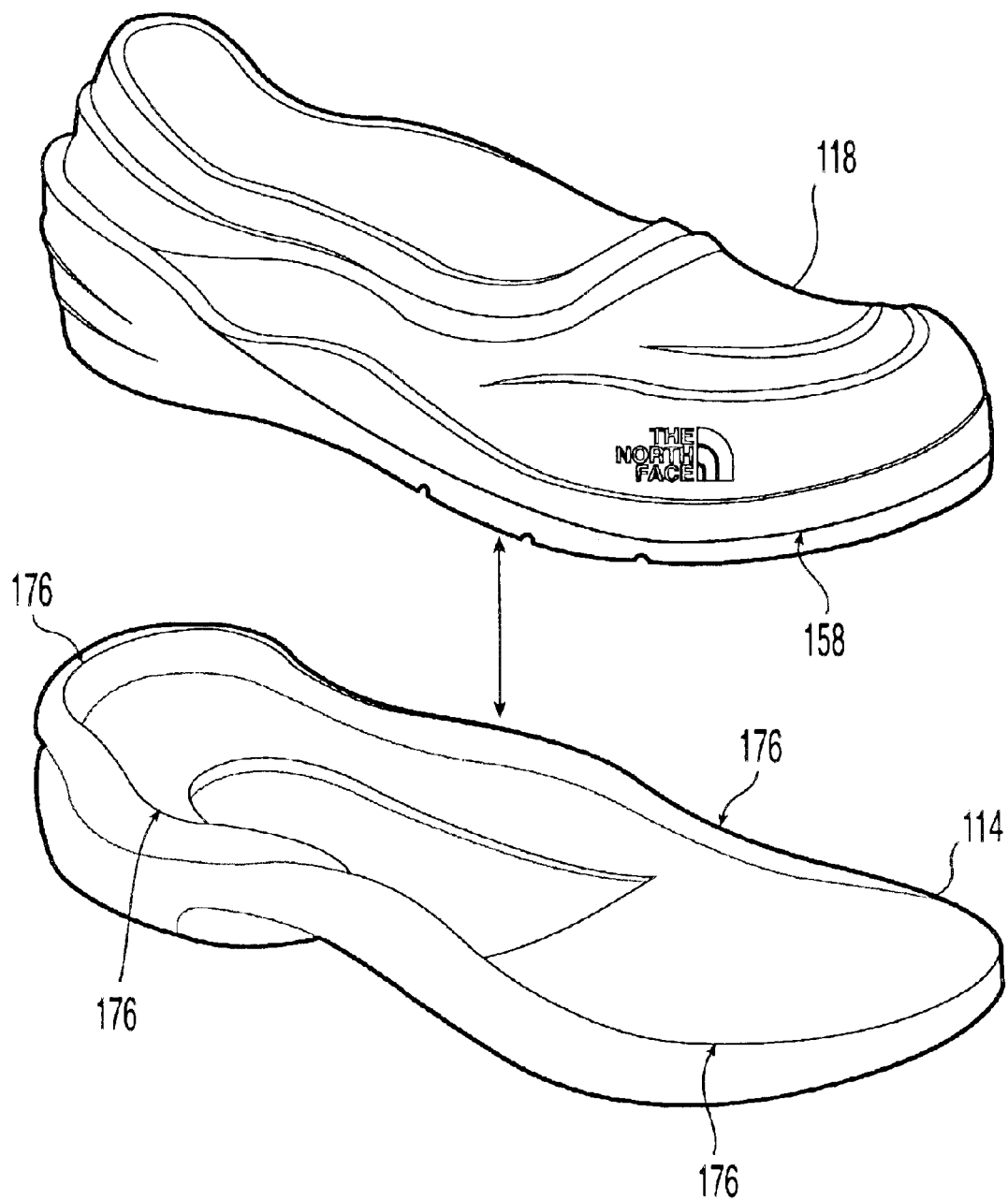
FIG. 9 shows a perspective view of the midsole and shell of FIG. 3.

Referring to FIGS. 6 to 8, an exemplary preferred shell 118 includes a toe end 150, a heel end 152, and lateral and medial sidewalls 154, 156, respectively, disposed therebetween. Because of the positioning of die portions 134, 136 to form upper and lower portions 134', 136', respectively, of shell 118, a flash line 158 is formed at the interface of die portions 134, 136 along an outer perimeter 160 of shell 118. In the exemplary preferred embodiment, flash line 158 coincides with an edge of ridge 162 along length $L_1$ of shell 118 proximate heel end 152. Flash line 158 continues along lateral and medial sidewalls 154, 156 along length $L_2$ of shell 118 defining surfaces 164, 166 adjacent flash line 158. The surface texturing on surfaces 164, 166 may be different, thus permitting flash line 158 to define a transition therebetween.

Advantageously, flash line 158 is substantially disposed remote from longitudinal axis 168 of shell 118. Thus, top portion 170 may be formed as a smooth surface without a feature such as a rib proximate axis 168 to hide a flash line. In addition, no flash line extends from the top edge 172 to the bottom edge 174 of heel end 152. Thus, shell 118 is configured such that flexure proximate axis 168 is not hindered by a flash line. Moreover, the stiffness of shell 118, particularly at top portion 170 proximate axis 168, may be selected as a function of design parameters without accounting for the presence of a flash line.

As shown in FIG. 8, flash line 158 extends around the periphery of shell 118. In addition, midsole 114 has an upper edge 176. In a preferred exemplary embodiment of boot 110, when shell 118 is coupled to midsole 114, the flash line 158 is disposed proximate upper edge 176. Thus, flash line 158 is hidden from view by midsole 114 and/or blends with upper edge 176 in an aesthetic manner. In an alternate embodiment, flash line 158 is hidden from view below upper edge 176 of midsole 114 when shell 118 is coupled to midsole 114.

While various descriptions of the present invention are described above, it should be understood that the various features can be used singly or in any combination thereof. For example, while flash line 158 is described as being disposed proximate or below an upper edge 176 of midsole 114 when shell 118 is coupled to midsole 114, the flash line 158 may alternatively be disposed above upper edge 176. In addition, shell 118 may be coupled to another component of a boot 110; for example, lower portion 136' of shell 118 may be coupled directly to an outsole 112, with flash line 158 being disposed proximate or below an upper edge of outsole 112. Thus, the present invention is not to be limited to only the specifically preferred embodiments depicted in the drawings.

Further, it should be understood that variations and modifications within the spirit and scope of the invention may occur to those skilled in the art to which the invention pertains. For example, if desired, one or more ribs or other surface features may be provided along the longitudinal axis 168 of shell 118, in addition to a flash line 158 running around a perimeter of shell 118 and disposed transverse to the rib. Such a rib may confer desired rigidity. Ribs may also be provided for added reinforcement in regions of localized stress concentrations. Also, molding techniques other than injection molding may be used, and in some embodiments, flash line 158 may be disposed along only a portion of the perimeter of shell 118. Accordingly, all expedient modifications readily attainable by one versed in the art from the disclosure set forth herein are within the scope and spirit of the present invention and are to be included as further embodiments. The scope of the present invention is accordingly defined as set forth in the appended claims.

What is claimed is:

1. A method of forming an article of footwear comprising:
   forming a shell between at least two die portions, the shell having a flash line defined proximate an interface of the die portions and along a perimeter thereof;
   coupling a component directly to the shell so that the flash line is at least in part disposed below an upper edge of the component, with the component selected from the group consisting of a midsole and an outsole.

2. The method of claim 1, further comprising:
   coupling the component directly to the shell so that the flash line is at least in part disposed proximate the upper edge of the component.

3. The method of claim 1, further comprising:
   coupling a midsole to a lower portion of the shell.

4. The method of claim 3, further comprising:
   disposing a shank between the midsole and shell.

5. The method of claim 3, further comprising:
   coupling an outsole to a lower portion of the midsole.

6. The method of claim 5, further comprising:
   disposing an insole inside the shell.

7. The method of claim 6, further comprising:
   disposing at least one cushion between the insole and shell.

8. The method of claim 7, wherein the at least one cushion comprises a cushion disposed proximate a heel region of the shell and a cushion disposed proximate a forefoot region of the shell.

9. The method of claim 6, further comprising:
   coupling an upper to an upper portion of the shell.

10. The method of claim 1, wherein the flash line extends substantially around a perimeter of the shell.

11. The method of claim 1, wherein at least a portion of the flash line coincides with an edge of a ridge on the shell.

12. The method of claim 11, wherein the ridge is disposed proximate a heel end of the shell.

13. The method of claim 1, wherein the flash line is disposed along a sidewall of the shell and defines a first surface above the flash line and a second surface below the flash line.

14. The method of claim 13, wherein the first and second surfaces have different texturing.

15. The method of claim 1, wherein the shell is formed of a polyurethane.

16. The method of claim 1, wherein the shell is formed by injection molding.

17. The method of claim 1, further comprising:
   bonding the component directly to the shell.

18. The method of claim 17, wherein the component and shell are adhesively bonded to each other.

19. The method of claim 1, further comprising:

disposing indicia on the shell.

20. The method of claim 19, wherein the indicia is integrally formed with the shell.

21. The method of claim 1, wherein each die portion defines one of the group consisting of substantially the entirety of an upper portion of the shell and substantially the entirety of a lower portion of the shell.

22. The method of claim 21, wherein the die portion defining the upper portion of the shell is disposed above the die portion defining the lower portion of the shell.

23. The method of claim 21, wherein the die portions are disposed in side by side relation such that the die portion defining the upper portion of the shell is disposed adjacent the die portion defining the lower portion of the shell, each die portion having a toe end and a heel end with the toe ends of the die portions disposed above the heel ends of the die portions.

24. The method of claim 1, further comprising:

disposing at least one rib on the shell transverse to the flash line.

25. The method of claim 1, wherein a top portion of the shell is substantially smooth proximate a central longitudinal axis of the shell.

26. The method of claim 1, wherein an inner mold portion is disposed in a cavity between the die portions when the shell is formed.

27. A method of forming an article of footwear comprising:

forming a shell between at least two cooperating die portions defining a cavity, the shell having a parting line defined proximate an interface of the die portions and extending around a perimeter thereof;

coupling a lower portion of the shell to a component selected from the group consisting of a midsole and an outsole;

wherein the component is coupled to the shell so that the parting line is at least in part disposed below an upper edge of the component.

28. The method of claim 27, wherein the component is coupled to the shell so that the parting line is in part disposed proximate the upper edge of the component.

29. The method of claim 27, wherein the shell is formed by injection molding.

30. The method of claim 29, wherein one of the at least two cooperating die portions defines a lower portion of the shell.

31. The method of claim 30, wherein the shell is formed by injecting polymer through a plurality of runners each communicating with the cavity proximate a bottom face of the die portion that defines the lower portion of the shell.

32. The method of claim 31, further comprising:

forming sprues only proximate an outside bottom portion of the shell.

33. The method of claim 32, further comprising:

substantially removing the sprues from the shell.

34. The method of claim 27, wherein each die portion defines one of the group consisting of substantially the entirety of an upper portion of the shell and substantially the entirety of a lower portion of the shell.

35. The method of claim 34, wherein the die portions are disposed in side by side relation, each die portion having a toe end and a heel end with the toe ends of the die portions being disposed above the heel ends of the die portions.

36. The method of claim 27, wherein the cooperating die portions comprise portions that mate in male-female relation when the die portions are aligned with respect to each other.

37. The method of claim 27, further comprising:

coupling an upper portion of the shell to an upper.

38. The method of claim 27, further comprising:

disposing an inner mold portion in the cavity while forming the shell.

39. The method of claim 27, wherein the parting line coincides with an edge of a ridge on the shell.

40. The method of claim 21, wherein the die portion defining the lower portion of the shell is disposed above the die portion defining the upper portion of the shell.

41. The method of claim 34, wherein the die portion defining the upper portion of the shell is disposed above the die portion defining the lower portion of the shell.

42. The method of claim 34, wherein the die portion defining the lower portion of the shell is disposed above the die portion defining the upper portion of the shell.

* * * * *